United States Patent
Hurd et al.

(10) Patent No.: US 11,358,572 B2
(45) Date of Patent: Jun. 14, 2022

(54) BRAKE CONTROL SYSTEM AND METHOD FOR AUTONOMOUS VEHICLE CONTROL

(71) Applicant: Raven Industries, Inc., Sioux Falls, SD (US)

(72) Inventors: Colin Josh Hurd, Ames, IA (US); Quincy Milloy, Ames, IA (US)

(73) Assignee: Raven Industries, Inc., Sioux Falls, SD (US)

( * ) Notice: Subject to any disclaimer, the term of this patent is extended or adjusted under 35 U.S.C. 154(b) by 325 days.

(21) Appl. No.: 16/452,882

(22) Filed: Jun. 26, 2019

(65) Prior Publication Data

US 2020/0001838 A1    Jan. 2, 2020

Related U.S. Application Data

(60) Provisional application No. 62/690,388, filed on Jun. 27, 2018.

(51) Int. Cl.
*B60T 7/12* (2006.01)
*B60T 7/04* (2006.01)
(Continued)

(52) U.S. Cl.
CPC .............. *B60T 7/12* (2013.01); *B60T 7/06* (2013.01); *B60T 7/18* (2013.01); *B60T 11/18* (2013.01);
(Continued)

(58) Field of Classification Search
CPC ..... B60T 7/06; B60T 7/12; B60T 7/18; B60T 11/18; B60T 11/203; G05G 1/01;
(Continued)

(56) References Cited

U.S. PATENT DOCUMENTS

| 3,726,369 A | 4/1973 | Jaos De Assuncao Esteves |
| 4,505,351 A | 3/1985 | Nishikawa |

(Continued)

FOREIGN PATENT DOCUMENTS

| JP | 2017016562 A | * | 1/2017 |
| KR | 20210115263 A | * | 9/2021 |
| WO | WO-2020006041 A1 | | 1/2020 |

OTHER PUBLICATIONS

"International Application Serial No. PCT/US2019/039180, International Search Report dated Sep. 19, 2019", 2 pgs.

(Continued)

*Primary Examiner* — Adam D Rogers
(74) *Attorney, Agent, or Firm* — Schwegman Lundberg & Woessner, P.A.

(57) ABSTRACT

A brake control system and method for autonomous vehicle control that includes a first brake pedal connected to a first brake arm, the first brake arm is connected to a first brake shaft, the first brake shaft extends a length between an upper end and lower end and includes a first actuator that expands and contracts in length. The lower end of the first brake shaft is operably connected to a first brake mechanism. An autonomous control system having a controller with microprocessor, memory and instructions is connected and controls operation of the first actuator. When the first brake shaft expands in length the first brake mechanism is engaged by the lower end of the first brake shaft thereby applying the brakes. The first brake mechanism is operable by depressing the first brake pedal in manual operation mode as well as by controlling the first actuator in autonomous operation mode.

43 Claims, 4 Drawing Sheets

(51) Int. Cl.
| | |
|---|---|
| *G05G 5/04* | (2006.01) |
| *G05G 1/30* | (2008.04) |
| *G05G 1/36* | (2008.04) |
| *B60T 11/16* | (2006.01) |
| *B60T 7/06* | (2006.01) |
| *G05G 1/44* | (2008.04) |
| *G05G 1/01* | (2008.04) |
| *G05G 1/46* | (2008.04) |
| *G05G 1/40* | (2008.04) |
| *B60T 11/20* | (2006.01) |
| *B60T 11/18* | (2006.01) |
| *B60T 7/18* | (2006.01) |
| *G05G 1/38* | (2008.04) |

(52) U.S. Cl.
CPC .............. *B60T 11/203* (2013.01); *G05G 1/01* (2013.01); *G05G 1/36* (2013.01); *G05G 1/38* (2013.01); *G05G 1/40* (2013.01); *G05G 1/44* (2013.01); *G05G 1/46* (2013.01); *G05G 5/04* (2013.01); *G05G 2505/00* (2013.01)

(58) Field of Classification Search
CPC .. G05G 1/30; G05G 1/36; G05G 1/38; G05G 1/40; G05G 1/44; G05G 1/46; G05G 5/04; G05G 2505/00; B62D 49/00
See application file for complete search history.

(56) References Cited

U.S. PATENT DOCUMENTS

| | | | |
|---|---|---|---|
| 8,874,341 B2 | 10/2014 | Crombez | |
| 9,221,434 B2* | 12/2015 | Gomez | ................... B60T 7/065 |
| 9,342,092 B2* | 5/2016 | Baur | ......................... G05G 1/40 |
| 10,065,615 B2* | 9/2018 | Sala | ........................... B60T 7/06 |
| 10,877,474 B2* | 12/2020 | Yun | ....................... G05D 1/0276 |
| 2001/0041959 A1* | 11/2001 | Satou | .................... B60W 30/16 |
| | | | 701/70 |
| 2007/0120418 A1* | 5/2007 | Kajita | ................... B60T 13/145 |
| | | | 303/114.1 |
| 2007/0240533 A1* | 10/2007 | Masumoto | ............... G05G 1/46 |
| | | | 74/481 |
| 2014/0222300 A1* | 8/2014 | Kakela | .................... E02F 9/226 |
| | | | 701/50 |
| 2020/0317167 A1* | 10/2020 | Ghaffari | .................... B60T 7/06 |
| 2021/0197866 A1* | 7/2021 | Ikenori | ............. B60W 60/0051 |

OTHER PUBLICATIONS

"International Application Serial No. PCT/US2019/039180, Written Opinion dated Sep. 19, 2019", 8 pgs.

* cited by examiner

BRAKE CONTROL SYSTEM AND METHOD FOR AUTONOMOUS VEHICLE CONTROL

CROSS REFERENCE TO RELATED APPLICATIONS

This Utility Patent Application claims priority to U.S. Provisional Patent Application No. 62/690,388 filed Jun. 27, 2018, which is fully incorporated by reference herein.

FIELD OF THE DISCLOSURE

This disclosure generally relates to autonomous control of vehicles. More specifically, and without limitation, this disclosure relates to a brake control system for autonomous control of vehicles.

BACKGROUND OF THE DISCLOSURE

At midnight on May 1, 2000, for the first time the U.S. government made military-grade Global Positioning System (GPS) satellite information available for non-military use. Access to this information, coupled with improvements in computing devices, has lead to the mass adoption of GPS systems in various industries including agriculture, forestry, fishing, construction, and transportation, really any industry where navigation and/or positioning is needed.

The mass adoption of the use of GPS for navigation and positioning, in association with improvements in computing and sensing technologies, has for the first time made truly autonomous vehicle operation a real possibility. However, one problem is that there is an installed base of millions of manually-operable vehicles (such as cars, trucks, tractors, boats, planes, and the like) that are not equipped to be autonomously controlled. This means that these vehicles must be scrapped, remain as manually-operable only, or they must be retrofitted with equipment that facilitates autonomous control.

Retrofitting vehicles to be autonomously controlled is a highly undesirable option. This is due to the substantial complexity associated with taking a manually-operable vehicle and converting it to an autonomously controlled vehicle. In addition, converting a manually-operable vehicle to an autonomously controlled vehicle is extremely costly. In addition, there is a wide variation in configuration between makes and models of vehicles that complicates matters substantially. In addition, many of the parts and systems needed to facilitate autonomous control of a manually-operable vehicle have yet to be conceived, designed, manufactured and tested. Further complexity is encountered when it is desired to convert the manually-operable vehicle to an autonomously controlled vehicle while preserving the ability to manually operate the vehicle. Specifically, as one example, problems and complexities exist in controlling braking systems of manually operable vehicles for autonomous control of the manually-operable vehicle while still allowing for manual operation.

Therefore, for all of the reasons stated above, and the reasons stated below, there is a need in the art for a brake control system and method for autonomous vehicle control that improves upon the state of the art.

Another object of the disclosure is to provide a brake control system and method for autonomous vehicle control that is easy to install.

Yet another object of the disclosure is to provide a brake control system and method for autonomous vehicle control that is safe to use.

Another object of the disclosure is to provide a brake control system and method for autonomous vehicle control that facilitates autonomous control as well as manual operation.

Yet another object of the disclosure is to provide a brake control system and method for autonomous vehicle control that allows for manual operation of the brakes without modification.

Another object of the disclosure is to provide a brake control system and method for autonomous vehicle control that seamlessly allows for autonomous control as well as manual operation.

Yet another object of the disclosure is to provide a brake control system and method for autonomous vehicle control that does not require reconfiguration of the brake system to switch between a manually controlled manner of operation and autonomously controlled manner of operation.

Another object of the disclosure is to provide a brake control system and method for autonomous vehicle control that modifies the brake system of the vehicle as minimally as possible.

Yet another object of the disclosure is to provide a brake control system and method for autonomous vehicle control that allows for manual overriding of autonomous control of the brake system.

Another object of the disclosure is to provide a brake control system and method for autonomous vehicle control that is minimally invasive to the vehicle.

Yet another object of the disclosure is to provide a brake control system and method for autonomous vehicle control that is relatively inexpensive.

Another object of the disclosure is to provide a brake control system and method for autonomous vehicle control that is robust in design.

Yet another object of the disclosure is to provide a brake control system and method for autonomous vehicle control that is robust in operation.

Another object of the disclosure is to provide a brake control system and method for autonomous vehicle control that has a long useful life.

Yet another object of the disclosure is to provide a brake control system and method for autonomous vehicle control that may be used with a broad array of vehicles.

Another object of the disclosure is to provide a brake control system and method for autonomous vehicle control that may be precisely operated.

Yet another object of the disclosure is to provide a brake control system and method for autonomous vehicle control that does not damage the vehicle.

Another object of the disclosure is to provide a brake control system and method for autonomous vehicle control that may be used with a broad array of vehicle makes and models.

Yet another object of the disclosure is to provide a brake control system and method for autonomous vehicle control that is safe to use.

Another object of the disclosure is to provide a brake control system and method for autonomous vehicle control that may be used in many applications.

Yet another object of the disclosure is to provide a brake control system and method for autonomous vehicle control that is relatively foolproof.

Another object of the disclosure is to provide a brake control system and method for autonomous vehicle control that is minimally obtrusive.

Yet another object of the disclosure is to provide a brake control system and method for autonomous vehicle control that is practically impossible to improperly set-up.

Another object of the disclosure is to provide a brake control system and method for autonomous vehicle control that requires little to no modification of the existing brake system.

Yet another object of the disclosure is to provide a brake control system and method for autonomous vehicle control that has a compact size.

Another object of the disclosure is to provide a brake control system and method for autonomous vehicle control that is high quality.

Yet another object of the disclosure is to provide a brake control system and method for autonomous vehicle control that improves efficiencies.

Another object of the disclosure is to provide a brake control system and method for autonomous vehicle control that may be controlled by a number of controllers.

Yet another object of the disclosure is to provide a brake control system and method for autonomous vehicle control that allows for simultaneous operation of left and right brakes.

Another object of the disclosure is to provide a brake control system and method for autonomous vehicle control that allows for individual operation of left and right brakes.

Yet another object of the disclosure is to provide a brake control system and method for autonomous vehicle control that may be used to help steer the vehicle.

These and countless other objects, features and/or advantages of the disclosure will become apparent from the specification, figures and claims.

BRIEF SUMMARY OF THE DISCLOSURE

A brake control system and method for autonomous vehicle control is presented that includes a first brake pedal connected to a first brake arm, the first brake arm is connected to a first brake shaft, the first brake shaft extends a length between an upper end and a lower end and includes a first actuator that expands and contracts in length. The lower end of the first brake shaft is operably connected to a first brake mechanism. An autonomous control system having a controller with a microprocessor, memory and instructions is connected to and controls operation of the first actuator. When the first brake shaft expands in length the first brake mechanism is engaged by the lower end of the first brake shaft thereby applying the brakes. The first brake mechanism is operable by depressing the first brake pedal in a manual operation mode as well as by controlling the first actuator in an autonomous operation mode.

DETAILED DESCRIPTION AND BEST MODE OF IMPLEMENTATION

Figure 1:
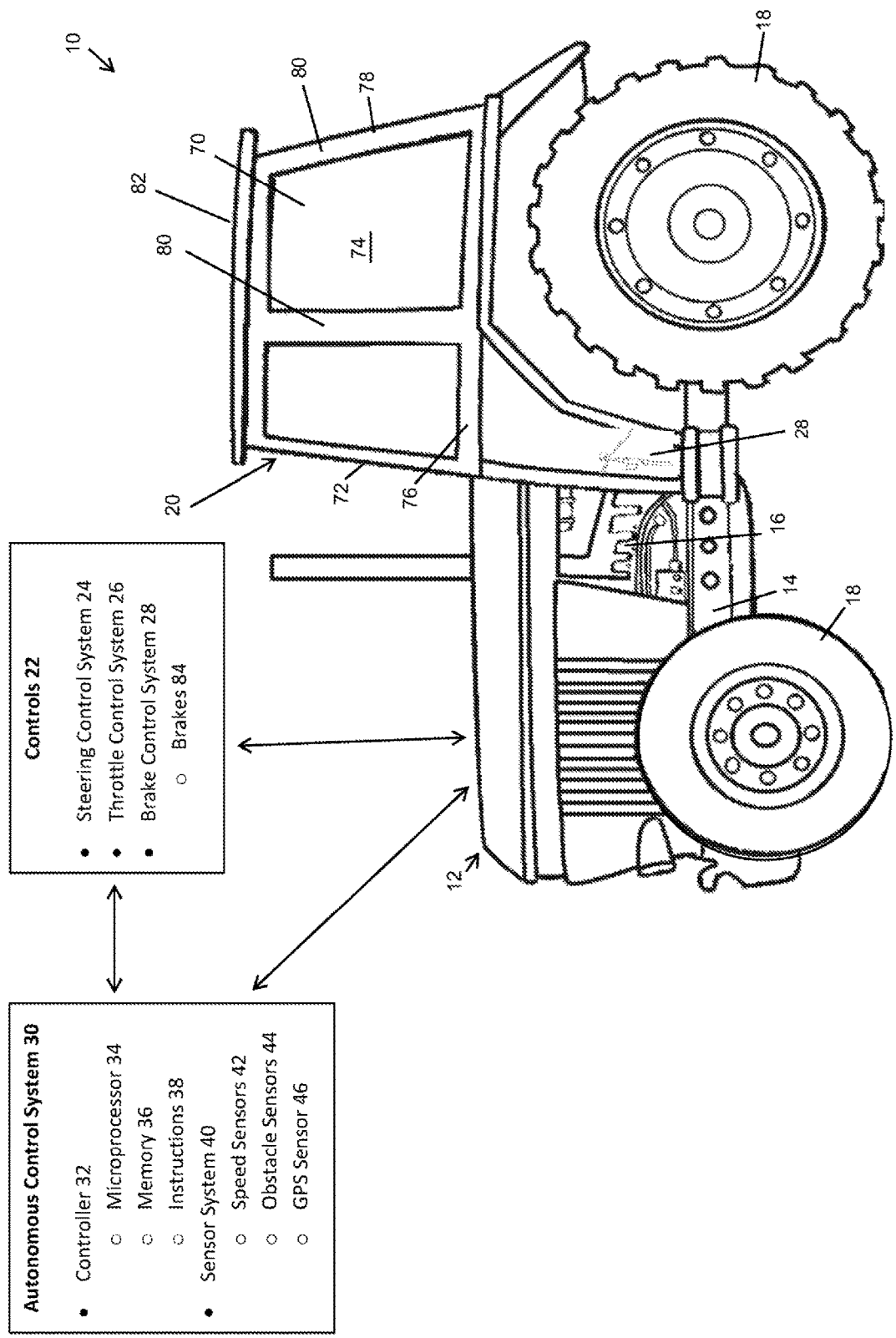
FIG. 1 is an elevation view of a vehicle, which in the image depicted is a tractor, that is used in association with the brake control system and method for autonomous vehicle control presented herein.
Figure 2:
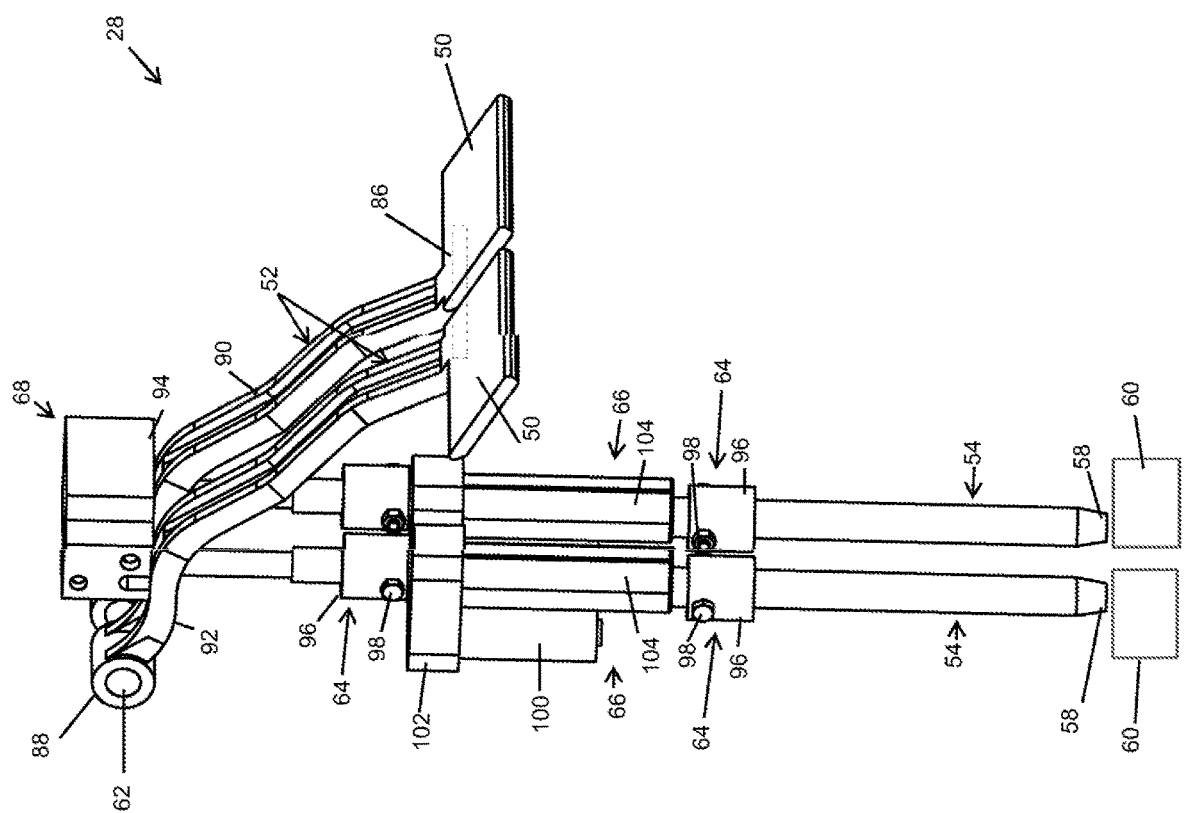
FIG. 2 is a perspective view of a brake control system that is separated in to a left brake and right brake, the brake control system having a pair of brake pedals, brake arms, brake shafts that extend from an upper end and a lower end, a brake mechanism positioned at the lower end of the brake shafts, a pivot point, an adjustment member, an actuator, and a stop member; the view showing the brake pedals in the upper most position with the upper edge of the brake arms in engagement with the lower edge of the stop member.
Figure 3:
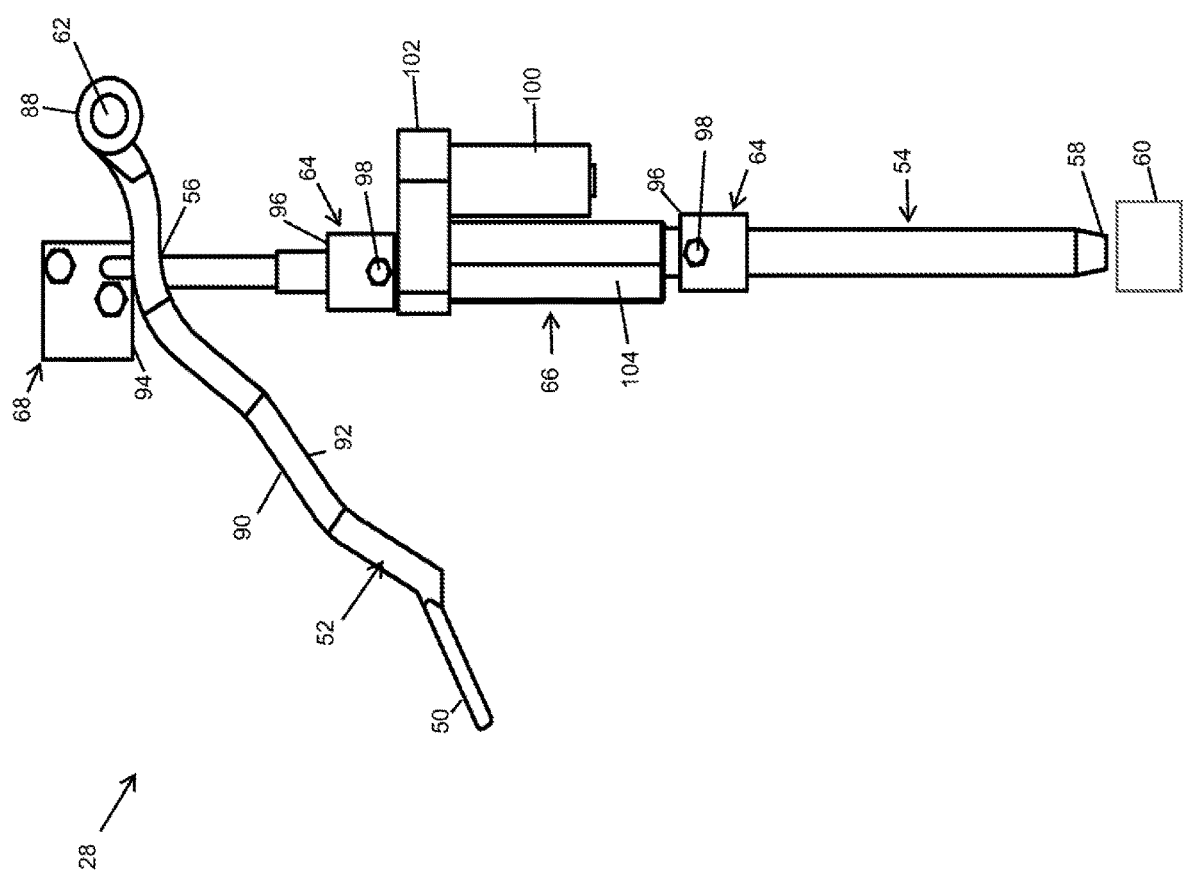
FIG. 3 is a side elevation view of the brake control system shown in FIG. 2.
Figure 4:
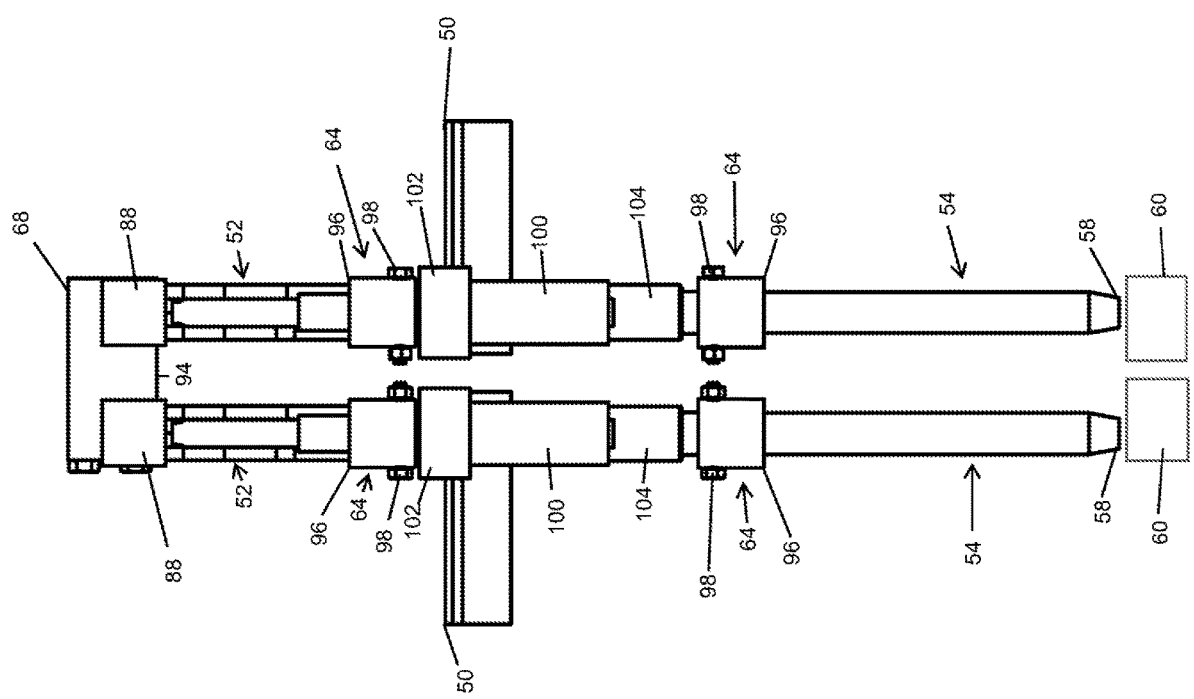
FIG. 4 is a rear elevation view of the brake control system shown in FIG. 2 and FIG. 3.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

System:

With reference to the figures, a system for autonomous vehicle control 10 (also referred to as simply system 10) is presented. The system for autonomous vehicle control 10 is formed of any suitable size, shape and design and is configured to facilitate autonomous driving of a vehicle 12 by providing one of the necessary components of autonomous driving, which is activation of the brakes. In the arrangement shown, as one example, the system for autonomous vehicle control 10 includes a vehicle 12 having a frame 14, an engine 16, wheels 18, a cab 20, controls 22, including a steering control system 24, a throttle control system 26, and a brake control system 28, among other components; an autonomous control system 30 having a controller 32 having a microprocessor 34, memory 36 and instructions 38, a sensor system 40 having a speed sensor 42, an obstacle sensor 44 and a GPS or other localization sensor(s) 46, among other sensors and components; the brake control system 28 having a first and second brake pedal 50, a first and second brake arm 52, a first and second brake shaft 54 extending a length from a upper end 56 to a lower end 58, a brake mechanism 60, a pivot point 62, an adjustment member 64, a first and second actuator 66 and a stop member 68, among other components, and features and systems.

Vehicle:

In the arrangement shown, as one example, the system for autonomous vehicle control 10 includes a vehicle 12. Vehicle 12 is formed of any suitable size, shape and design and is configured to be operated in a manual operation mode and an autonomous operation mode. In the arrangement shown, as one example, vehicle 12 is shown as what is known as a conventional tractor. However any other form of a vehicle is hereby contemplated for use such as a car, truck, van, bus, semi, motorcycle, boat, plane, bulldozer, backhoe, four wheeler, dump truck, utility vehicle, or any other type of a vehicle or piece of movable equipment. While reference may be made herein to vehicle 12 being a tractor, this is simply for simplicity and clarity. The use of a tractor as vehicle 12 is only one of countless examples, and is not meant to be limiting in any way.

In the arrangement shown, as one example, vehicle 12 includes a frame 14. Frame 14 is formed of any suitable size, shape and design and is configured to provide strength and structural rigidity to vehicle 12 as well as to facilitate the connection of the other components of vehicle 12 to one another.

In the arrangement shown, as one example, vehicle 12 includes an engine 16. Engine 16 is formed of any suitable size, shape and design and is configured to provide power for operation of vehicle 12. Engine 16 may be a gas powered engine, a diesel engine, an electric motor, and/or any combination thereof.

In the arrangement shown, as one example, vehicle 12 includes a plurality of wheels 18. Wheels 18 are formed of any suitable size, shape and design and are configured to facilitate the support of vehicle 12 as well as facilitate travel of vehicle 12 over the land. In the arrangement shown, as one example, vehicle 12 includes four wheels 18, a pair of front wheels 18 and a pair of rear wheels 18, however any other arrangement is hereby contemplated for use such as any number of wheels (two, three, four, five, six, seven, eight, nine, ten, eleven, twelve or more), any number of axles, or the like, or any combination thereof. Furthermore, the term wheels is intended to include track-type arrangements which inherently move through the operation of wheels.

In the arrangement shown, as one example, vehicle 12 includes a cab 20. Cab 20 is formed of any suitable size, shape and design and is configured to house one or more occupants of the vehicle 12 as well as house some if not all of the controls 22 of the vehicle 12 and other components of vehicle 12. In the arrangement shown, as one example, cab 20 forms a hollow interior 70 that houses and holds one or more occupants, one of which may be the driver (when vehicle 12 is operating in a manual operation mode). In the arrangement shown, cab 20 includes and/or is formed by a windshield 72, side windows 74, one or more doors 76, a rear window 78, frame members 80 and a roof 82, among other components.

Again, while a conventional tractor is shown as vehicle 12, any form of a vehicle is hereby contemplated for use.

Controls:

In the arrangement shown, as one example, vehicle 12 includes controls 22. Controls 22 are formed of any suitable size, shape and design and are configured to facilitate operation and control of vehicle 12 in a manual operation mode, in an autonomous operation mode, in a combination of manual operation mode and autonomous operation mode, and in a manual override to an autonomous operation mode. In the arrangement shown, as one example, controls 22 of vehicle 12 include steering control system 24, throttle control system 26, and brake control system 28, among other controls that facilitate the operation of vehicle 12.

In the arrangement shown, as one example, controls 22 include steering control system 24. Steering control system 24 is formed of any suitable size, shape and design and is configured to facilitate steering of vehicle 12 and may include a steering wheel, a joy stick, a rudder, fins of an aircraft, or any combination thereof, or the like.

In the arrangement shown, as one example, controls 22 include throttle control system 26. Throttle control system 24 is formed of any suitable size, shape and design and is configured to facilitate control of the engine 16 and thereby one manner of control of acceleration and deceleration. Throttle control system 24 may include a throttle pedal, a throttle roller ball, a throttle wheel, a throttle joy-stick (wherein the throttle is controlled by movement of the joystick), a throttle level, or any other arrangement or any combination thereof or the like.

In the arrangement shown, as one example, controls 22 include brake control system 26. Brake control system 26 is formed of any suitable size, shape and design and is configured to facilitate control of brakes 84 of vehicle 12, as is further described herein.

Autonomous Control System:

In the arrangement shown, as one example, vehicle 12 includes an autonomous control system 30. Autonomous control system 30 is formed of any suitable size, shape and design and is configured to facilitate autonomous operation and control of vehicle 12 in an autonomous operation mode. In the arrangement shown, as one example, autonomous control system 30 of vehicle 12 includes a controller 32 having a microprocessor 34, memory 36, instructions 38, and a sensor system 40 having one or more speed sensors 42, obstacle sensors 44, and a GPS or other localization sensor(s) 46, among other components and systems.

In the arrangement shown, as one example, autonomous control system 30 includes a controller 32. Controller 32 is formed of any suitable size, shape and design and is configured to facilitate autonomous control of vehicle 12. In the arrangement shown, as one example, controller 32 includes at least one microprocessor 34, memory 36, and instructions 38, and in combination these components receive information and output commands thereby autonomously controlling vehicle 12.

Microprocessor 34 is any programmable device that accepts analog or digital signals or data as input, processes it according to instructions 38 stored in memory 36, and provides results as output. Memory 36 is any form of an information storage device such as flash memory, a hard drive, ram memory, or the like, that receives information, stores the information for later use, and provides access to the information upon request. Instructions 38 is any form of information that provides the rules and guidelines regarding operation of controller 32 and may include software, code, information or any other form of information or instructions. Controller 32, and its associated components of microprocessor 34, memory 36, and instructions 38, may be formed of a single unitary component, or may be formed of any number of electronically connected components, or any combination thereof.

When operating in an autonomous-operation mode, controller 32 outputs commands that controls operation of steering control system 24, throttle control system 26, brake control system 28 and any other component of vehicle 12 that is needed for operation of vehicle 12 in an autonomous-operation mode.

Sensor System:

In the arrangement shown, as one example, autonomous control system 30 includes a sensor system 40. Sensor system 40 is formed of any suitable size, shape and design and is configured to facilitate autonomous control of vehicle 12 through sensing of the conditions of and around vehicle 12. In the arrangement shown, as one example, sensor system 40 includes at least one speed sensor 42, at least one obstacle sensor 44, and at least one GPS or other localization sensor(s) 46, among other components, and in combination these components sense information and output this information to controller 22 which is used in the autonomous control of vehicle 12.

Speed sensor 42, which may be one or multiple components or devices that may be unitary or separate but connected, is any device that senses the speed, acceleration and/or direction or any other operational character of the movement of vehicle 12. Speed sensor 42 outputs its sensed information as results to controller 22 which is used in the autonomous control of vehicle 12. Obstacle sensor 44, which may be one or multiple components or devices that may be unitary or separate but connected, is any device that senses obstacles around vehicle 12 and/or in the direction of travel of vehicle 12 and may include visual cameras, infrared cameras, radar, lidar, lasers, or any other detection system or arrangement. Obstacle sensor 44 outputs its sensed information as results to controller 22 which is used in the autonomous control of vehicle 12. GPS or other localization sensor(s) 46, which may be one or multiple components or devices that may be unitary or separate but connected, is any device that senses the position of vehicle 12 through communication with satellites and/or terrestrial antennas to determine the position of vehicle 12. GPS or other localization sensor(s) 46 outputs its sensed information as results to controller 22 which is used in the autonomous control of vehicle 12.

Brake Control System:

With the information received from sensor system 40, autonomous control system 30 autonomously controls operation of vehicle 12 by controller 32 outputting commands and control signals that control steering control system 24 and throttle control system 26 as well as other components of vehicle 12. However, in many vehicles 12, brakes 84 cannot be autonomously controlled due to their manual and mechanical nature.

In the arrangement shown, as one example, to facilitate autonomous control of vehicle 12, brake control system 28 is installed in vehicle 12 and is electrically connected to and controlled by controller 32 of autonomous control system 30.

Brake control system 28 is formed of any suitable size, shape and design and is configured to facilitate autonomous control of vehicle 12 by providing autonomously controlled braking. In the arrangement shown, as one example, brake control system 28 includes a first and second brake pedal 50, a first and second brake arm 52, a first and second brake shaft 54 extending a length from an upper end 56 to a lower end 58, a brake mechanism 60, a pivot point 62, an adjustment member 64, a first and second actuator 66 and a stop member 68, among other components, and features and systems.

In the arrangement shown, as one example, brake control system 28 is bifurcated into a first and second side by having separate first and second brake pedals 50, brake arms 52, brake shafts 54, brake mechanisms 60, adjustment members 64, and actuators 66, among other components. This bifurcation allows for individual control of left brakes 84 and right brakes 84. In the arrangement shown, as one example, this brake control system 28 is generally symmetric in nature meaning that each side is generally similar if not identical to one another, or in one arrangement, each side is a mirror image of one another. Allowing for individual control of left brakes 84 and right brakes 84 allows for the utilization of braking to help steer vehicle 12, and also allows for more-precise control of vehicle 12. As an example, by having individually controllable left brakes 84 and right brakes 84, autonomous control system 30 may individually control the left brakes 84 and right brakes 84 depending on the sensed conditions, direction of travel, and other factors. That is, as an example, when autonomous control system 30 senses one side of vehicle 12 slipping or spinning, autonomous control system 30 can control the brakes 84 on that side of the vehicle 12 independent of the brakes 84 on the opposite side of vehicle 12 to optimize performance of vehicle 12 and/or prevent a hazardous condition and/or correct unexpected travel or operation of vehicle 12.

While a bifurcated brake control system 28 is presented, with independently controllable left and right components, the left brake pedal 50 and right brake pedal 50 can be connected together with a movable mechanical link 86, such as a lever or rod or post, that can be moved in place for locked simultaneous control and moved out of place for individual control. In addition, while a bifurcated brake control system 28 is presented, it is contemplated that the teaching herein may be used with a brake control system 28 having a single brake control system 28, having only a single brake pedal 50, brake arm 52, brake shaft 54, brake mechanism 60, adjustment member 64 and actuator 66, or alternatively a brake control system 28 that has any number of these components such as three, four, five, six or more.

Brake Pedal: In the arrangement shown, as one example, brake control system 28 includes a first and second brake pedal 50. Brake pedal 50 is formed of any suitable size, shape and design and is configured to provide an extended surface area for a driver to step on to manually initiate brakes 84. In the arrangement shown, as one example, first and second brake pedal 50 are generally flat square or rectangular members that conveniently and comfortably may be pressed down upon by a driver's foot to initiate brakes 84. In the arrangement shown, the upper-forward-inward side of first and second brake pedal 50 are connected to a brake arm 52.

Brake Arm: In the arrangement shown, as one example, brake control system 28 includes a first and second brake arm 52. Brake arm 52 is formed of any suitable size, shape and design and is configured to connect brake pedal 50 to the other components of brake control system 28 as well as transfer pressure and movement of brake pedal 50 to other components of brake control system 28. In the arrangement shown, as one example, first and second brake arms 52 are generally elongated levers that connect at their lower rearward end to pedal 50 and connect at their upper forward end to pivot point 62. Brake arm 52 also connects to brake shaft 54 adjacent its upper end 56 or first end. As such, when brake pedal 50 is depressed, this causes brake arm 52 to pivot upon pivot point 62 which causes brake pedal 50 and brake arm 52 to move downward thereby depressing brake shaft 54 through the connection between brake shaft 54 and brake arm 52.

In the arrangement shown, as one example, each brake arm 52 is formed of a pair of levers that are spaced from one another. These levers are generally flat vertically oriented bars that extend in approximate parallel spaced relation to one another from their rearward lower end to their upper forward end. In this arrangement, the brake shaft 54 is received within this space between the opposing levers. The use of two levers with a space between them provides strength and rigidity to brake arm 52 as well as a convenient connection to brake shaft 54. The use of two levers with a space between them also provides a convenient way for brake shaft 54 to pass through brake arm 52 by passing through the space between opposing brake levers. This may also be accomplished by a hole or other opening in brake arm 52 that allows the passage of brake shaft 54 through brake arm 52.

In the arrangement shown, as one example, the upper forward end of brake arm 52 includes a collar 88 that is configured to engage pivot point 62 and facilitate rotation of brake arm 52 upon pivot point 62. In the arrangement shown, as one example, collar 88 is a generally cylindrical member with a hollow interior that is sized and shaped to receive the cylindrical axle of pivot point 62 therein. In this way, collar 88 provides a strong, robust, simple and durable connection to pivot point 62 that facilitates rotation of brake arm 52 on pivot point 62.

In the arrangement shown, as one example, when brake arm 52 is viewed from the side, it is seen that the generally flat vertically oriented bars of brake arm 52 extend vertically between an upper edge 90 and a lower edge 92. It is also seen, when brake arm 52 is viewed from the side that brake arm 52 extends a length in generally straight sections connected by generally curved sections, so to provide convenient and comfortable placement of brake pedal 50. In the arrange shown, as one example, brake arm 52 extends from its upper forward end, which connects to pivot point 62, downward and rearward at an angle to its lower rearward end, which connects to brake pedal 50.

In the arrangement shown, as one example, when brake pedal 50 is in a fully raised position, the upper edge 90 of brake arm 52 near its forward upward end engages a lower edge 94 of stop member 68. In this way, the lower edge 94 of stop member 68 establishes the upper most position of brake arm 52 and brake pedal 50, which in a manual-operation mode, corresponds to non-engagement of brakes 84 and/or brake mechanism 60. As brake pedal 50 is pressed downward, brake pedal 50 increasingly moves downward, as does brake arm 52 as collar 88 rotates on pivot point 62. As brake pedal 50 moves downward, the upper edge 90 of brake arm 52 moves increasingly away from the lower edge 94 of stop member 68 which corresponds with increasing engagement of brakes 84 through increasing engagement of the lower end 58 of brake shaft 54 with brake mechanism 60. In this way, the brakes 84 of vehicle 12 are engaged.

Brake Shaft: In the arrangement shown, as one example, brake control system 28 includes a first and second brake shaft 54. Brake shaft 54 is formed of any suitable size, shape and design and is configured to connect brake pedal 50 and brake arm 52 to the other components of brake control system 28 as well as transfer pressure and movement of brake pedal 50 and brake arm 52 to other components of brake control system 28. In the arrangement shown, as one example, first and second brake shaft 54 are generally elongated rods that connect at their upper end 56 to stop member 68 and/or brake arm 52 and connect at their lower end 58 to brake mechanism 60. As such, when brake pedal 50 is depressed, this causes brake arm 52 to pivot upon pivot point 62 which causes downward movement of brake shaft 54 which causes engagement of the lower end 58 of brake shaft 54 on brake mechanism 60. As brake pedal 50 is increasingly depressed downward, this causes increasingly downward movement of brake shaft 54 which causes increasingly downward movement of the lower end 58 of brake shaft 54 upon brake mechanism 60 which causes increasingly applied brakes 84 of vehicle 12.

In the arrangement shown, as one example, brake shaft 54 is a generally cylindrical member that extends a length between an upper end 56 and a lower end 58, however any other configuration, design or arrangement is hereby contemplated for use. In the arrangement shown, as one example, the upper end 56 of brake shaft 54 is slidably held within an opening of stop member 68 so as to allow downward movement of brake shaft 54 upon manual depression of brake pedal 50. However, any other manner, method or means of connecting the upper end 56 of brake shaft 54 to stop member 68 while allowing for the required relative movement is hereby contemplated for use.

In the arrangement shown, as one example, the upper end 56 of brake shaft 54 is also connected to brake arm 52. In one arrangement, the upper end 56 of brake shaft 54 and brake arm 52 are connected in a manner that allows for slight rotation of brake arm 52 relative to brake shaft 54 as brake arm 52 moves downward. This may be accomplished by way of a pivotal or hinge-like connection. Through the connection of brake arm 52 to brake shaft 54, as brake pedal 50 is depressed, brake arm 52 moves lower which transfers this downward motion to brake shaft 54 which causes increasingly downward movement of the lower end 58 of brake shaft 54 upon brake mechanism 60 which causes increasingly applied brakes 84 of vehicle 12.

In the arrangement shown, as one example, when brake pedal 50 is in a fully raised position, the upper end 56 of brake shaft 54 is fully inserted within an opening in the lower edge 94 of stop member 68. Also in this position, the upper edge 90 of brake arm 52 engages a lower edge 94 of stop member 68 (which stops the upward movement of brake arm 52). In this way, the lower edge 94 of stop member 68 establishes the upper most position of brake arm 52 and brake pedal 50, which in a manual-operation mode, corresponds to non-engagement of brakes 84 and/or brake mechanism 60. As brake pedal 50 is pressed, brake pedal 50 increasingly moves downward, as does brake arm 52 as collar 88 rotates on pivot point 62. As brake pedal 50 moves downward, the upper edge 90 of brake arm 52 moves increasingly away from the lower edge 94 of stop member 68 which corresponds with increasing engagement of brakes 84 through increasing engagement of the lower end 58 of brake shaft 54 with brake mechanism 60. As brake pedal 50 moves downward, the connection between brake arm 52 and brake shaft 54 causes brake shaft 54 to increasingly move downward. This downward movement of brake shaft 54 causes increasing downward movement of the lower end 68 of brake shaft 54 upon brake mechanism 60 thereby causing increasing application of brakes 84.

In the arrangement shown, as one example, the lower end 58 of brake shaft 54 is positioned in engagement with, or in near engagement with, or in operable engagement with brake mechanism 60. Through this direct or operable connection of the lower end 56 of brake shaft 54 with brake mechanism 60, as the brake shaft 54 moves lower, the increasing pressure is applied to brake mechanism 60, thereby causing increasing application of brakes 84.

Brake Mechanism: In the arrangement shown, as one example, brake control system 28 includes a first and second brake mechanism 60. Brake mechanism 60 is formed of any suitable size, shape and design and is configured to control operation brakes 84. In the arrangement shown, as one example, first and second brake mechanism 60 are positioned at or near the lower end 58 of brake shaft 54. As the brake shaft 54 moves lower, the lower end 58 of brake shaft 54 engages brake mechanism 60 thereby causing increasing operation of brake mechanism 60 thereby causing engagement of brakes 84.

In one arrangement, brake mechanism 60 is a valve or valve mechanism of a hydraulic brake system. In this arrangement, when brake mechanism 60 is engaged and depressed by the lower end 58 of brake shaft 54, this causes increasing hydraulic pressure on brakes 84.

Any other form of a brake mechanism 60 is hereby contemplated for use, such as an electronic sensor, a mechanical linkage or any other arrangement.

Pivot Point: In the arrangement shown, as one example, brake control system 28 includes a pivot point 62. Pivot point 62 is formed of any suitable size, shape and design and is configured to facilitate connection of brake arm 52 to vehicle 12 as well as to facilitate rotation of brake pedal 50 and brake arm 52 when brake pedal 50 is depressed. In the arrangement shown, as one example, pivot point 60 is a cylindrical shaft that is configured to receive the cylindrical collar 88 of the upper forward end of brake arm 52 thereon. This connection between the collar 88 of brake arm 52 and pivot point 62 allows for a strong, durable and rigid connection of brake arm 52, while also allowing for rotation of brake arm 52. It is hereby contemplated that brake arm 52 may be connected by any other manner, method or means.

Adjustment Member: In the arrangement shown, as one example, brake control system 28 includes an adjustment member 64. Adjustment member 64 is formed of any suitable size, shape and design and is configured to facilitate adjustment of the length of brake shaft 54 so as to facilitate fine-tuning of the brake control system 28 for optimal performance. This allows for the use of brake control system 28 with practically any vehicle and with practically any user as brake control system 28 is adjustable in length, which may allow for the adjustment of the height of brake pedal 50.

In the arrangement shown, as one example, adjustment member 64 includes a collar 96 that engages brake shaft 54 and allows for sliding adjustment of the length of brake shaft 54. In the arrangement shown, as one example, once the length of brake shaft 54 is set, one or more locking bolts 98 are tightened in place, thereby affixing the length of the brake shaft 54.

The use of adjustment member 64 provides the ability to make the brake shaft 54 the optimum length, such that when brake pedal 50 is in a non-deployed position, the upper edge 90 of brake arm 52 is in flat and flush engagement with the lower edge 94 of stop member 68. This fine-tuning takes slop out of the brake control system 28 and increases the ease and accuracy of applying the brakes 84.

Actuator: In the arrangement shown, as one example, brake control system 28 includes a first and second actuator 66. Actuator 66 is formed of any suitable size, shape and design and is configured to expand and contract the length of brake shaft 54 so as to facilitate autonomous control of brakes 84. In the arrangement shown, as one example, actuator 66 is placed in-line with the length of brake shaft 54 between upper end 56 and lower end 58 of brake shaft 54 such that when actuator 66 is activated to expand, the length of brake shaft 54 extends thereby applying brakes 84, and when actuator 66 is activated to retract, the length of brake shaft 54 retracts thereby releasing the brakes 84.

Actuator 66 may be formed of any device that facilitates the extension and contraction of the length of brake shaft 54. Or, alternatively, actuator 66 is any device that selectively applies the brakes 84 or releases the brakes 84. In the arrangement shown, an electric actuator is shown in use that is configured to convert electric power to linear motion; this may also be known as a linear actuator. As one example, an electric solenoid is used. As another example, an electric motor with a threaded shaft and rotatable component that extends or contracts in length depending on the direction of rotation is hereby contemplated for use. As another example, a hydraulic actuator, or hydraulic valve or hydraulic piston, that extends or contracts in length depending on the pressure and direction of flow of hydraulic fluid is contemplated for use. As another example, a pneumatic actuator, or pneumatic valve or pneumatic piston, that extends or contracts in length depending on the pressure and direction of flow of hydraulic fluid is contemplated for use. As another example, a pneumatic air bag or hydraulic bag or other member that is expandable and retractable by flowing fluid or gas into and out of the expandable member is used. Any other controllable length-extending and/or length-contracting component is hereby contemplated for use as actuator 66.

In the arrangement wherein a hydraulic actuator is used, the hydraulic actuator may be connected to a source of hydraulic power from the vehicle 12 itself, or alternatively a self-contained source of hydraulic power may be used that is not connected to a source of hydraulic power of the vehicle 12. In the arrangement wherein a pneumatic actuator is used, the pneumatic actuator may be connected to a source of pneumatic power from the vehicle 12 itself, or alternatively a self-contained source of pneumatic power may be used that is not connected to a source of pneumatic power of the vehicle 12.

In the arrangement shown, as one example, actuator 66 includes a motor 100 that is connected by a housing 102 to a moving component 104. In this arrangement, motor 100 is any form of an electric motor that converts electrical power to motion. In the arrangement shown, as one example, motor 100 is positioned outside of the in-line length of brake shaft 54 and extends in approximate parallel spaced relation to the length of brake shaft 54. When power is applied to motor 100, motor rotates in either a clockwise or counterclockwise direction thereby extending or contracting the length of brake shaft 54. In this arrangement, motor 100 is electrically connected to controller 32 of autonomous control system 30 which controls the supply of power to motor 100.

In the arrangement shown, as one example, the upper end of motor 100 is connected to housing 102. Housing 102 is formed of any suitable size, shape and design and is configured to connect motor 100, which is outside of the length of brake shaft 54 to moving component 104, which is in-line with the length of brake shaft 54. In one arrangement, housing 102 houses and holds components that facilitate transfer of rotation of a shaft of motor 100 to the moving component 104, which may include a gearbox, a gearing arrangement, a sprocket and chain arrangement, a threaded shaft or shafts, or any other movement-transferring arrangement.

In the arrangement shown, as one example, the moving component 104 of actuator 66 is placed in-line with the length of brake shaft 54. In this way, as the length of moving component expands or contracts, so does the length of brake shaft 54. As the length of moving component 104 extend, the lower end 58 of brake shaft 54 engages brake mechanism 60 thereby engaging brakes 84 to slow or stop vehicle 12. In an alternative arrangement, as one example, the moving component 104 of actuator 66 is placed outside of the linear length of brake shaft 54 but is connected to the upper portion and lower portion of brake shaft 54 which facilitates the expansion and contraction of the length of brake shaft 54. In this way, as the length of moving component expands or contracts, so does the length of brake shaft 54.

Any other form or arrangement of an actuator system is hereby contemplated for use to extend and contract the length of brake shaft 54 and/or engage brake mechanism 60 and/or initiate engagement of brakes 84.

The arrangement presented herein, wherein actuator 66 is presented in line with brake shaft 54 is convenient for retrofitting a manual vehicle 12 as all that needs to be done is to remove the existing brake shaft 54 and replace the brake shaft 54 presented herein with the in-line actuator 66 and then electrically connect the actuator 66 to the controller 32 of the autonomous control system 30. This makes for a quick, easy and simple conversion of manually controlled brakes 84 to autonomously controlled brakes 84.

Stop Member: In the arrangement shown, as one example, brake control system 28 includes a stop member 68. Stop member 68 is formed of any suitable size, shape and design and is configured to provide stop surface that establishes an upper limit of motion for brake pedal 50 and brake arm 52 and brake shaft 54. In a manual operation mode, a user presses down on brake pedal 50, which causes downward motion of brake arm 52 which causes downward motion of brake shaft 56. However, when actuator 66 is placed in-line with brake shaft 54, when autonomous operation of the brakes 84 occurs, this causes the length of brake shaft 54 to increase. This causes the lower end 58 of brake shaft 54 to press downward upon brake mechanism 60. If the upper end 56 of brake shaft 54 is not captured or limited then the brake shaft 54 would simply move upward instead of press downward upon brake actuator 60. By connecting the upper end of brake shaft 54 to stop member 68 this ensures that when the length of brake shaft 54 extends, when the brake pedal 50 and brake arm 52 are in a fully raised position, or stop position, that the brake mechanism 60 is engaged.

That is, stop member 68 sets the upper-most limit of brake control system 28. As such, when the length of brake shaft 54 increases, through the expansion of actuator 66, when the brake arm 52 is in engagement with the stop member 68, the lower end 58 of brake shaft 54 can only move downward as the upper end of brake shaft is constrained. As the lower end 58 of brake shaft 54 moves downward, the lower end 58 of brake shaft engages brake mechanism 60 thereby applying the brakes 84.

In the arrangement shown, stop member 68 is a generally square or rectangular member that is connected to vehicle 12 by any manner, method or means to as to ensure stop member 68 remains in place during operation. The lower edge 94 of stop member 68 is generally flat and is configured to engage the upper edge 90 of brake arm 52 when pedal 50 and brake arm 52 are in a fully raised positon. The flat surface of the lower edge 94 of stop member 68 so configured to provide a flat and flush stopping surface for the engagement of the upper edge 90 of brake arm 52. The lower edge 94 of stop member 68 also receives and holds the upper end 56 of brake shaft 54 therein.

In Operation: In operation, a manually-operable vehicle 12 is converted to an autonomously-operable vehicle 12 by installing autonomous control system 30 including controller 32, microprocessor 34, memory 36 and instructions 38 into vehicle 12. Also, sensor system 40 is installed including speed sensors 42, obstacle sensors 44 and GPS or other localization sensor(s) 46 is installed in vehicle 12. Also, brake control system 28 is installed in vehicle 12. These components are operably connected to one another so as to facilitate autonomous control of vehicle 12 through the use of autonomous control system 30 having a controller 32, microprocessor 34, memory 36, and instructions 38.

Brake control system 28 is installed by first removing the existing brake shaft and installing the brake shaft 54 with the in-line actuator 66. In many vehicles 12, this conversion is simple, quick and efficient to perform as the brake shaft of vehicle 12 is simply removed and replaced with the brake shaft 54 of brake control system 28 which is similar if not identical to the factory brake shaft with the difference being that it includes the in-line length-adjusting actuator 66 and adjustment member 64. For all intents and purposes, other than facilitating autonomous control, replacing the factory brake shaft with the brake shaft 54 of the brake control system 28 is unnoticeable and does not affect the manual operation of brakes 84.

At this time it is worth noting that to facilitate manual operation as well as manual-override of the brake control system 28 while operating in an autonomous operation mode, actuator 66 is configured to not collapse in length when pressure is applied to brake pedal 50 by a driver. This allows the brake shaft 54 with in-line actuator 66 to be used in a manual operation mode as the driver simply presses down on the brake pedal 50 which causes operation of the brakes 84 in a seamless manner as if the factory brake shaft was in place. This also allows the driver to apply the brakes 84 by pressing on the brake pedal 50 when driving in an autonomous as well as in a non-autonomous or manual operation mode. As the actuator 66 does not collapse in length, as the driver applies pressure to the brake pedal 50 this causes the brake pedal 50 to rotate downward, which causes downward pressure and downward movement on brake shaft 54. As the brake shaft 54, or more specifically actuator 66, does not collapse in length, this causes the lower end 58 of brake shaft 54 to move downward upon brake mechanism 60 thereby manually applying the brakes 84 and essentially overriding the autonomous operation mode. In this way, a driver always has the ability to stop the vehicle 12 even when operating in an autonomous operation mode. In one arrangement, when the brakes 84 are manually applied this cancels the autonomous operation mode and initiates the manual operation mode.

When brake shaft 54 is installed in vehicle 12, in one arrangement, a stop member 68 is also installed thereby establishing the upper limit of movement of brake pedal 50 and brake arm 52. In one arrangement, stop member 68 is connected to the steering column or other frame member or portion of vehicle 12 that will maintain the position of stop member 68 so as to rigidly and repeatedly maintain the same upper limit during years of use.

Once brake control system 28 is installed, and connected to autonomous control system 30, brakes 84 may be autonomously controlled when operating in an autonomous control mode.

In this arrangement, brakes 84 may be both manually controlled as well as autonomously controlled. This is accomplished because in-line actuator 66 does not collapse, or does not substantially collapse, in length when manual pressure is applied to brake pedal 50, whether operating in a manual operation mode or an autonomous operation mode.

Once installation is complete, when operating in a manual operation mode, vehicle 12 generally operates the same way it did before being converted to facilitate autonomous operation. That is, the brake pedal 50 operates in generally the same way—when the brake pedal 50 is pressed, the brakes 84 are applied. The harder the brake pedal 50 is pressed, the more brake pressure is applied. As such, from a driver's perspective, the vehicle 12 operates in a manual operation mode the same way it did prior to conversion of the vehicle 12 to an autonomously controlled vehicle.

That is, in a manual operation mode, when the driver presses on the brake pedal 50 this causes brake arm 52 to rotate upon pivot point 62. This downward rotation of brake arm 52 upon pivot point 62 causes brake shaft 54 to move downward. As the in-line portions of actuator 66 do not collapse in length, or do not appreciably or noticeably collapse in length when manual pressure is applied along the length of brake shaft 54, this causes the lower end 58 of brake shaft 54 to engage and apply increasingly more pressure on brake mechanism 60 thereby increasingly applying the brakes 84.

When manual pressure is released on brake pedal 50, the brake pedal 50 moves upward as the brake arm 52 rotates upward on pivot point 62, which causes the lower end 58 of brake shaft 54 to increasingly apply less pressure on brake mechanism 60 thereby increasingly applying less pressure on brakes 84 until brakes 84 are disengaged.

When operating in an autonomous operation mode, controller 32 of autonomous control system 30 controls operation of brake control system 28, or more specifically the extension and/or retraction of actuator 66 thereby engagement and disengagement of brakes 84. In the autonomous operation mode, autonomous control system 30 determines when the brakes 84 need to be applied, based on all sensed information, from sensor system 40 including but not limited to speed sensors 42, obstacle sensors 44, GPS or other localization sensor(s) 46 as well as any other sensor, and in view of the interpretation of information by microprocessor 34 in association with instructions 38 stored in memory 36. When autonomous control system 30 determines to apply the brakes 84, controller 32 transmits a signal to brake control system 28. Upon reception of this signal, actuator 66 begins to expand in length (by motor 100 rotating in a first direction). That is, in one arrangement, motor 100 is initiated, through its connection to housing 102 this causes moving component 104 to expand in length. As the length of moving component 104 of brake control system 28 expands, the upper end 56 of brake shaft 54 forces upward as the lower end 58 of brake shaft 54 forces downward. As the upper end 56 of brake shaft 54 forces upward, this causes the brake arm 52 to move upward until the upper edge 90 of brake arm 52 engages the lower end 94 of stop member 68, thereby defining the upper most position of brake arm 52 and brake pedal 50. When the brake arm 52 and brake pedal 50 are captured in their upper most position, the lower end 58 of brake arm 52 begins to move downward as the length of brake shaft 54 expands as the length of actuator 66 expands. As the length of brake shaft 54 expands, the lower end 58 of brake shaft 54 operatively engages and/or acts upon brake mechanism 60. As the length of brake shaft 54 increasingly expands, as the upper end 56 of brake shaft 54 cannot move upward, the lower end 58 can only move downward. As the lower end 58 of brake shaft 54 moves increasingly downward, increasing pressure is applied on brake mechanism 60 which causes increasing application of brakes 84.

When autonomous control system 30 determines to release the brakes 84, controller 32 transmits a signal to brake control system 28. Upon reception of this signal, actuator 66 begins to retract in length (by motor 100 rotating in an opposite direction). As the length of moving component 104 of brake control system 28 retracts, the lower end 58 brake shaft 54 moves upward as the length of actuator 66 retracts. As the length of brake shaft 54 retracts, the lower end 58 of brake shaft 54 operatively disengages and/or acts-less upon brake mechanism 60. As the length of brake shaft 54 increasingly decreases, the lower end 58 moves upward. As the lower end 58 of brake shaft 54 moves increasingly upward, decreasing pressure is applied on brake mechanism 60 which causes decreasing application of brakes 84.

At any time during autonomous operation, a driver may depress the brake pedal 50 and manually initiate brakes 84.

From the above discussion it will be appreciated that the brake control system and method for autonomous vehicle control presented herein improves upon the state of the art.

Specifically, the brake control system and method for autonomous vehicle control presented: is easy to install; is safe to use; facilitates autonomous control as well as manual operation; allows for manual operation of the brakes without modification; seamlessly allows for autonomous control as well as manual operation; does not require reconfiguration of the brake system to switch between a manually controlled manner of operation and autonomously controlled manner of operation; modifies the brake system of the vehicle as minimally as possible; allows for manual overriding of autonomous control of the brake system; is minimally invasive to the vehicle; is relatively inexpensive; is robust in design; is robust in operation; has a long useful life; may be used with a broad array of vehicles; may be precisely operated; does not damage the vehicle; may be used with a broad array of vehicle makes and models; is safe to use; may be used in many applications; is relatively foolproof; is minimally obtrusive; is practically impossible to improperly set-up; requires little to no modification of the existing brake system; has a compact size; is high quality; improves efficiencies; may be controlled by a number of controllers; allows for simultaneous operation of left and right brakes; allows for individual operation of left and right brakes; may be used to help steer the vehicle.

It will be appreciated by those skilled in the art that other various modifications could be made to the device without parting from the spirit and scope of this disclosure. All such modifications and changes fall within the scope of the claims and are intended to be covered thereby.

What is claimed:

1. A brake control system for autonomous control of a vehicle, the system comprising:
   a first brake pedal;
   the first brake pedal operably connected to a first brake shaft;
   the first brake shaft extending a length between a first end and a second end;
   a first actuator operably connected to the first brake shaft;
   the first brake shaft operably connected to a first brake mechanism;
   wherein the first actuator is configured to extend or retract the first brake shaft in response to the first actuator; and
   wherein the first brake mechanism is operable by depressing the first brake pedal in a manual operation mode as well as by controlling the first actuator in an autonomous operation mode.

2. The system of claim 1, further comprising:
   a second brake pedal;
   the second brake pedal operably connected to a second brake shaft;
   the second brake shaft extending a length between a first end and a second end;
   a second actuator operably connected to the second brake shaft;
   the second brake shaft operably connected to a second brake mechanism;
   wherein the second actuator is configured to extend or retract the second brake shaft in response to the second actuator; and
   wherein the second brake mechanism is operable by depressing the second brake pedal in a manual operation mode as well as by controlling the second actuator in an autonomous operation mode.

3. The system of claim 1, wherein the second end of the first brake shaft engages the first brake mechanism thereby activating the first brake mechanism.

4. The system of claim 1, wherein the first actuator is positioned in line with the first brake shaft.

5. The system of claim 1, wherein the first actuator is selected from the group consisting of: a linear actuator; an electric actuator; a hydraulic actuator; and a pneumatic actuator.

6. The system of claim 1, wherein the first brake mechanism is a valve.

7. The system of claim 1, wherein the first brake mechanism is a valve operably connected to at least one brake of the vehicle.

8. The system of claim 1, further comprising an autonomous control system having a controller operably connected to the first actuator and configured to control operation of the first actuator.

9. The system of claim 1, further comprising a stop member, wherein the stop member is configured to establish an upper limit of movement of a first brake arm.

10. The system of claim 1, further comprising a stop member, wherein the stop member is configured to establish an upper limit of movement of a first brake arm such that when the first actuator extends, the first brake shaft presses upon the first brake mechanism when the first brake arm engages the stop member at the upper limit.

11. The system of claim 1, wherein the vehicle is a tractor.

12. The system of claim 1, wherein the vehicle is an agricultural vehicle.

13. The system of claim 1, wherein the vehicle is an off-road vehicle.

14. The system of claim 1, further comprising the first brake shaft having an adjustment member, wherein the adjustment member facilitates extending and shortening the length of the first brake shaft.

15. The system of claim 1, further comprising the first brake pedal operably connected to a first brake arm; and
the first brake arm operably connected to the first brake shaft.

16. A brake control system for autonomous control of a vehicle, the system comprising:
a first brake pedal;
a first brake shaft operably connected to the first brake pedal;
a first actuator operably connected to the first brake shaft;
wherein the first actuator is configured to facilitate a responsive extension or retraction movement of the first brake shaft;
a controller of an autonomous control system operably connected to the first actuator and configured to control operation of the first actuator;
a first brake mechanism operably connected to the first brake shaft; and
wherein the first brake mechanism is operable by depressing the first brake pedal in a manual operation mode as well as by controlling the first actuator in an autonomous operation mode.

17. The system of claim 16, further comprising:
a second brake pedal;
a second brake shaft operably connected to the second brake pedal;
a second actuator operably connected to the second brake shaft;
wherein the second actuator is configured to facilitate a responsive extension or retraction movement of the second brake shaft;
the controller of the autonomous control system operably connected to the second actuator and configured to control operation of the second actuator;
a second brake mechanism operably connected to the second brake shaft; and
wherein the second brake mechanism is operable by depressing the second brake pedal in a manual operation mode as well as by controlling the second actuator in an autonomous operation mode.

18. The system of claim 16, wherein the first brake shaft extends a length from a first end to a second end, wherein the second end of the first brake shaft engages the first brake mechanism thereby activating the first brake mechanism.

19. The system of claim 16, where the first actuator is in-line with the first brake shaft.

20. The system of claim 16, wherein the first actuator is selected from the group consisting of: a linear actuator; an electric actuator; a hydraulic actuator; and a pneumatic actuator.

21. The system of claim 16, wherein the first brake mechanism is a valve.

22. The system of claim 16, wherein the first brake mechanism is a valve operably connected to at least one brake of the vehicle.

23. The system of claim 16, further comprising a stop member, wherein the stop member is configured to establish an upper limit of movement of a first brake arm.

24. The system of claim 16, further comprising a stop member, wherein the stop member is configured to establish an upper limit of movement of a first brake arm such that when the first actuator extends, the first brake arm presses upon the first brake mechanism when the first brake arm engages the stop member at the upper limit.

25. The system of claim 16, wherein the vehicle is a tractor.

26. The system of claim 16, wherein the vehicle is an agricultural vehicle.

27. The system of claim 16, wherein e vehicle is an off-road vehicle.

28. The system of claim 16, further comprising the first brake shaft having an adjustment member, wherein the adjustment member facilitates extending and shortening the length of the first brake shaft.

29. A brake control system for autonomous control of a vehicle, the system comprising:
a first brake pedal;
the first brake pedal operably connected to a first brake shaft;
the first brake shaft extending a length between a first end and a second end;
a first actuator operably connected to the first brake shaft;
the first brake shaft operably connected to a first brake mechanism;
wherein the first actuator is configured to lengthen or retract the first brake shaft; and
wherein the first brake mechanism is operable by depressing the first brake pedal in a manual operation mode as well as by controlling the first actuator and lengthening or retracting the first brake shaft in an autonomous operation mode.

30. The system of claim 29, further comprising:
a second brake pedal;
the second brake pedal operably connected to a second brake shaft;
the second brake shaft extending a length between a first end and a second end;
a second actuator operably connected to the second brake shaft;
the second brake shaft operably connected to a second brake mechanism;

wherein the second actuator is configured to lengthen or retract the second brake shaft; and wherein the second brake mechanism is operable by depressing the second brake pedal in a manual operation mode as well as by controlling the second actuator in an autonomous operation mode.

31. The system of claim 29, wherein the second end of the first brake shaft engages the first brake mechanism thereby activating the first brake mechanism.

32. The system of claim 29, wherein the first actuator is positioned in line with the first brake shaft.

33. The system of claim 29, wherein the first actuator is selected from the group consisting of: a linear actuator; an electric actuator; a hydraulic actuator; and a pneumatic actuator.

34. The system of claim 29, wherein the first brake mechanism is a valve.

35. The system of claim 29, wherein e first brake mechanism is a valve operably connected to at least one brake of the vehicle.

36. The system of claim 29, further comprising an autonomous control system having a controller operably connected to the first actuator and configured to control operation of the first actuator.

37. The system of claim 29, wherein a stop member is configured to establish an upper limit of movement of a first brake arm such that when the first actuator extends, the first brake pedal presses upon the first brake mechanism when the first brake arm engages the stop member at the upper limit.

38. The system of claim 29, wherein the vehicle is a tractor.

39. The system of claim 29, wherein the vehicle is an agricultural vehicle.

40. The system of claim 29, wherein the vehicle is an off-road vehicle.

41. The system of claim 29, further comprising the first brake shaft having an adjustment member, wherein the adjustment member facilitates extending and shortening the length of the first brake shaft.

42. The system of claim 29, further comprising the first brake pedal operably connected to a first brake arm; and the first brake arm operably connected to the first brake shaft.

43. The system of claim 29, further comprising a stop member; and wherein the stop member is configured to establish an upper limit of movement of a first brake arm.

\* \* \* \* \*